United States Patent [19]

Wolff et al.

[11] 4,297,145
[45] Oct. 27, 1981

[54] SILANE/FILLER PREPARATIONS, PROCESS FOR THEIR PRODUCTION AND THEIR USE

[75] Inventors: Siegfried Wolff, Bornheim-Merten; Lothar Rothbühr, Hürth-Hermülheim; Grewatta Cologne, all of Fed. Rep. of Germany

[73] Assignee: Degussa Aktiengesellschaft, Frankfurt, Fed. Rep. of Germany

[21] Appl. No.: 178,159

[22] Filed: Aug. 14, 1980

[30] Foreign Application Priority Data

Aug. 17, 1979 [DE] Fed. Rep. of Germany ....... 2933346

[51] Int. Cl.$^3$ ................................................ C09C 1/28
[52] U.S. Cl. .......................... 106/308 Q; 260/42.15; 260/763
[58] Field of Search .......................... 106/307, 308 Q; 260/42.15, 763

[56] References Cited

U.S. PATENT DOCUMENTS

| 3,873,489 | 3/1975 | Thurn et al. | 106/308 Q |
| 3,997,356 | 12/1976 | Thurn et al. | 106/308 Q |
| 4,072,701 | 2/1978 | Pletka et al. | 260/448.8 R |
| 4,076,550 | 2/1978 | Thurn et al. | 106/308 Q |
| 4,128,438 | 12/1978 | Wolff et al. | 106/307 |

FOREIGN PATENT DOCUMENTS

| 2542534 | 9/1975 | Fed. Rep. of Germany | 260/448.8 R |
| 2528134 | 1/1976 | Fed. Rep. of Germany | 106/308 N |
| 2255577 | 7/1976 | Fed. Rep. of Germany | 106/308 Q |
| 2536674 | 2/1977 | Fed. Rep. of Germany | 106/307 |
| 2747277 | 4/1979 | Fed. Rep. of Germany | 106/307 |
| 1592861 | 5/1979 | Fed. Rep. of Germany | 106/307 |

Primary Examiner—James Poer
Attorney, Agent, or Firm—Cushman, Darby & Cushman

[57] ABSTRACT

The invention relates to a silane/filler preparation, consisting essentially of from 5 to 70% by weight of at least one silane corresponding to the following formula $$X_p-C_mH_{2m+1-p}SiR_n^1(OR)_{3-n},\qquad I$$

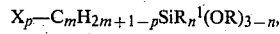

in which
X = a halogen atom, preferably chlorine or bromine,
p = 1 or 2,
m = 1 to 5,
$R^1$ = a $C_1$–$C_5$ alkyl group, $C_5$–$C_8$-cycloalkyl group or a phenyl group,
R = a $C_1$–$C_5$-alkyl group, a $C_5$–$C_8$-cycloalkyl group, a phenyl group, a benzyl group or a $C_1$–$C_5$-alkoxy-$C_1$–$C_5$-alkyl group, and
n = 0, 1 or 2, and—respectively balanced to 100%—from 95 to 30% by weight of at lesat one inorganic filler, preferably carbon black and silicate fillers as, e.g., silica. There is also disclosed a process for the production of the silane/filler preparation and its use in optionally cross-linkable polymeric moulding compositions or vulcanizable or cross-linkable rubber moulding compositions such as sulphur-vulcanizable moulding compositions based on natural rubber and/or synthetic rubber.

23 Claims, No Drawings

SILANE/FILLER PREPARATIONS, PROCESS FOR THEIR PRODUCTION AND THEIR USE

BACKGROUND OF THE INVENTION

This invention relates to powder-form or granular silane/filler preparations which are used in particular in vulcanisable rubber moulding compositions based on natural or synthetic rubbers or blends thereof which contain at least one synthetic or natural silicate filler and/or carbon black.

Powder-form mixtures of oligosulphidic silanes and silicate fillers are already known (German OS No. 22 55 577 and related Thurn U.S. Pat. No. 3,873,489), as are powder-form mixtures of mercaptosilanes and silicate fillers (German AS No. 25 28 134). Mixtures of carbon black and oligosulphidic silanes (German OS No. 27 47 277 and related Wolff U.S. Pat. No. 4,128,438) are also known. The entire disclosures of the Thurn and Wolff U.S. patents are hereby incorporated by reference and relied upon. All these mixtures are eminently suitable for use in rubber moulding compositions and the alkoxy silanes used therefor are of the type which contain sulphur bound to carbon. This sulphur plays a noticeable part in the vulcanisation reaction.

SUMMARY OF THE INVENTION

It was all the more surprising then to discover, as applicants have done, that halogen alkyloxysilanes, of which the typical representative is 3-chloropropyl triethoxy silane (Cl-PTES in short), also produced valuable effects in rubber moulding compositions and valuable property improvements in their vulcanisates. Thus, mixtures and moulding compositions based on halogen rubbers containing silicate fillers and halogen silanes of the type in question have already been proposed. It was even more surprising to find, as has now been found, that these silanes produce unexpected effects of an advantageous nature, even in silicate-filled moulding compositions based on the most common halogen-free rubbers, and also surprising improvements in the properties of the vulcanisates.

In the light of previous experience and in view of the prior art referred to above, it was even less to be expected that, according to the present invention, some important properties of the rubber mixtures and their vulcanisates can be improved even further by using a silane/filler preparation for the production of the moulding compositions rather than using the silane and the filler separately in the production of the mixtures.

The present invention provides a silane/filler preparation, consisting of from 5 to 70% by weight of at least one silane corresponding to the following formula

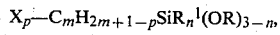$-C_mH_{2m+1-p}SiR_n^1(OR)_{3-n}$,   I in which
X = a halogen atom, e.g., fluorine or iodine but preferably chlorine or bromine,
p = 1 or 2,
m = 1 to 5,
$R^1$ = a $C_1$- to $C_5$-alkyl group, $C_5$- to $C_8$-cycloalkyl group or a phenyl group,
R = a $C_1$- to $C_5$-alkyl group, a $C_5$- to $C_8$-cycloalkyl group, a phenyl group, a benzyl group or a $C_1$- to $C_5$-alkoxy-$C_1$- to $C_5$-alkyl group, and
n = null, 1 or 2, and—respectively balanced to 100%—from 95 to 30% by weight of at least one inorganic filler.

The preparations according to the invention are granular or powder-form preparations which are stable in storage and, in general, also stabilise the hydrolysis-sensitive alkoxy silanes in the preparations, which in addition—in contrast to the liquid or powder-form starting materials—are present in a non-dust-forming, readily processible aggregate state convenient to the processor (rubber-processing industry) and which, most importantly, produce valuable effects in rubber mixtures based on natural and/or synthetic rubbers with or without halogens in the molecule which are filled e.g. with silicate fillers and, advantageously, with carbon black. These effects and improvements in the properties of the vulcanisates produced by the silane/filler preparations according to the invention, which in some instances are synergistic effects in relation to the separate addition of silane and filler to the other constituents of the mixture, are explained further below and, in particular, in the Examples.

Carbon blacks which are eminently suitable for the purposes of the invention include the types known per se, particularly the so-called rubber blacks used in the rubber-processing industry, preferably furnace blacks, such as HAF- and ISAF-carbon blacks, and the commercially available powder-form Printex ® carbon blacks manufactured by DEGUSSA with specific surfaces, as measured by the nitrogen absorption method according to DIN No. 66 132 (German Industrial Standard 66132), of from about 30 to 140 m²/g and mean primary particle sizes (arithmetic mean) of from about 20 to 60 nanometers. Mixtures of different carbon blacks may also be used for producing the preparations according to the invention, for example mixtures of Printex ® 60 and Printex ® 300 or mixtures of Printex ® 30 and Printex ® 300. Powder-form products or free-flowing non-tacky granulates are obtained, depending on the production process used and the mixing ratio within the claimed quantitative ratios of silane to carbon black.

Suitable synthetic inorganic fillers are primarily the reinforcing fillers and used in the rubber industry, particularly the commercially available powder-form pyrogenic or precipitated silicas manufactured by Degussa, such as Aerosil ®, Ultrasil ® VN 3, Ultrasil ® VN 2, Silteg ® AS 9, Silteg ® AS 7, Durosil ® and Extrusil ®, with specific surface areas (see DIN No. 66 132) of from about 20 to 400 m²/g, preferably from 100 to 250 m²/g, and mean primary particle sizes of from about 10 to 400 nanometers. Mixtures of these various silicas may also be used for producing the preparations according to the invention.

Natural inorganic fillers are also suitable for the purposes of the invention, examples being kaolins, clay, chalk, siliceous chalk, diatomaceous earth (kieselguhr), finely powdered quartz sands and asbestoses. It is also possible to use fillers in the form of mixed oxides or oxide mixtures of silicon dioxide with the oxides of the metals aluminium, magnesium, calcium, barium, zinc and/or titanium.

The inorganic fillers can also have been hydrophobised in known manner with silanes of which typical representatives are Degussa's commercial products e.g. AEROSIL ® R 972 (based on pyrogenic silica) and SIPERNAT ® D 17 (based on precipitated silica).

Synthetic silicates, for example aluminium silicates or alkaline-earth metal silicates, such as magnesium or calcium silicate, with specific surface areas of from about 20 to 400 m²/g and primary particle sizes of from about 10 to 400 nm may also be used.

Filler mixtures, such as silica/kaolin or silica/kieselguhr/chalk and blends of the silicate-containing reinforcing fillers with the known rubber-grade carbon blacks, for example silica/HAF-carbon black or silica/kaolin/ISAF-carbon black, may also be successfully used for producing the preparations according to the invention.

The halogen alkoxysilanes corresponding to formula I, which are present in the preparations according to the invention in quantities of from 5 to 70% by weight, preferably in quantities of from 15 to 60% by weight and advantageously in quantities of 50% by weight, include in particular the following silanes: chloromethyl trimethoxysilane, chloromethyl triethoxysilane, bromomethyl triethoxysilane, dichloromethyl triethoxysilane, 1-chloro-1-methyl methyl trimethoxy silane, 2-chloroethyl trimethoxy silane, 2-bromoethyl trimethoxy silane, 2-dibromoethyl trimethoxy silane, 3-bromopropyl trimethoxysilane, 3-chloropropyl trimethoxysilane, 3-dichloropropyl trimethoxysilane, 3-chloropropyl triethoxysilane, 3-bromopropyl triethoxy silane, 3-dibromopropyl triethoxysilane, 2-bromo-1-methylethyl tripropoxysilane, 2-dichloroethyl tri-n-butoxy silane, 2-chloroethyl tri-2-methyl propoxysilane, 3-bromopropyl tri-t-butoxy silane, 3-dibromopropyl triisopropoxysilane, 3-bromopropyl tri-n-pentoxysilane, 5-chloropentyl trimethoxysilane, 2-iodoethyl trimethoxysilane, 2-chloroethyl tri-2'-ethyl-ethoxysilane, 2-bromo-2-methyl-ethyl dimethoxyethoxy silane, 3-dichloropropyl methoxy-ethoxy-propoxy silane, 3-chloropropyl dimethoxy methyl silane, 3-bromopropyl diethoxy ethyl silane, 3-chloropropyl ethoxy diethyl silane, 3-bromopropyl tris-(1-methoxyethoxy)-silane, 3-chloropropyl diethoxy phenyl silane, 3-dichloropropyl dimethoxycyclopentyl silane, 3-bromopropyl di-n-propoxy cyclohexyl silane, 3-chloropropyl dicyclohexoxy cyclohexyl silane, 3-bromopropyl diethoxy cycloheptyl silane, 3-chloropropyl ethoxyphenyloxyethyl silane, 3-dibromopropyl benzyloxyethoxyethyl silane, 4-chloro-n-butyl trimethoxysilane, 4-bromo-n-butyl trimethoxysilane, 3-chloro-2-methyl propyl trimethoxysilane, 3-chloro-3-methyl propyl cyclo-octyl dipropoxysilane, 3-chloro-2-ethyl-propyl diethoxymethylsilane, 3-bromo-3-ethyl-propyl dimethoxymethylsilane, 3-chloro-2-methyl propyl dimethoxyphenylsilane, 5-chloro-n-pentyl triethoxy silane, 4-bromo-1-methylbutyl-cyclooctoxy dimethoxysilane, 4-bromo-2-methylbutyl triethoxysilane, 2-chloro-2-methyl-ethyl tripentoxysilane, 2-dichloro-2-methyl-ethyl tributyloxysilane, 3-bromopropyl triphenoxysilane, 3-chloropropyl tribenzyloxysilane, 3-dibromopropyl tricyclopentoxysilane, 3-bromopropyl tri-ni-pentoxysilane, dibromomethyl triethoxysilane, dichloromethyl triethoxysilanes, 2-dichloroethyl triethoxysilane, 2-dibromoethyl tri-n-propoxysilane, 3-dichloropropyl triethoxysilane, 2-dichloro-i-propyl triethoxysilane, 2-dibromo-i-propyl tri-i-propoxysilane, 3-dichloropropyl tri-n-propoxysilane, 3-dibromopropyl tri-n-butoxysilane, 4-dichlorobutyl triethoxysilane, 4-dibromobutyl tri-n-propoxysilane, 5-dichloropentyl triethoxysilane, 5-dibromopentyl tri-n-propoxysilane and mixtures of these halogen alkyloxysilanes. It is preferred to use those halogen alkyloxysilanes which contain one halogen atom (p=1 in formula I) and three alkoxysilyl groups and mixtures thereof.

The silanes corresponding to formula I can be obtained by method known per se, for example from halogen silanes still containing at least one hydrogen atom, by catalytically controlled addition with a halogenated hydrocarbon containing a C-C-double bond (hydrosilylation). The halogen atom(s) situated on the silicon atom are then converted into alkoxy silanes again in known manner, for example, by alcoholysis. It has been found that the crude silanes emanating from production may be directly used with success for the purposes of the invention providing they are substantially free from hydrolysable halide and hydrogen halide. If present, these impurities are removed by treatment with ammonia or sodium hydride, optionally followed by rectification.

The preparation is produced in high-speed mixers known per se, such as powder mixers, propeller mixers or bead-forming and granulating machines.

The present invention also relates to the process for producing the silane/filler preparations described above. In this process at least one carbon black and/or at least one inorganic filler in powder form is introduced into a powder mixer in a quantity of from 95 to 30% by weight, at least one liquid silane corresponding to formula I is then added in a quantity of from 5 to 70% by weight, respectively balanced to 100% relative to the filler, followed by brief intensive mixing until a powder-form or granular, free-flowing preparation is formed.

The silanes may with advantage be sprayed onto the particles of the filler(s) in motion in the powder mixer. Alternatively, they are applied in solution or suspension to the particles of the filler(s) in motion in the powder mixer.

The compositions can comprise, consist essentially of or consist of the stated material.

Unless otherwise indicated all parts and percentages are by weight.

DETAILED DESCRIPTION OF THE INVENTION

Production Examples

Example 1

The inorganic filler used is a carbon black having the following test data (Printex ® 30, a product of Degussa A. G., D-6000 Frankfurt-am-Main):

| | |
|---|---|
| Nitrogen surface area according to DIN 66 132 | 78 m²/g |
| Mean primary particle size | 27 nm |
| pH-value (DIN 53 200) | 9 |
| Dibutyl phthalate absorption according to DIN 53 601 | 100 ml/100 g |

10 kg of the above-defined carbon black were weighed into a trough-shaped powder mixer 150 liters in capacity equipped with a propeller-like mixing tool, 10 kg of 3-chloropropyl triethoxysilane were then added and the mixture components processed with one another and homogenised for 30 seconds at 360 r.p.m. The apparatus used is described in German AS No. 15 92 861. After withdrawal of the discharge unit, 20 kg of a granulate having a mean particle diameter of 1.0 mm are removed. The granulate thus produced was dust-free, non-tacky, free-flowing, stable on storage and easily meterable and could readily be mixed in in the production of rubber moulding compositions.

Example 2

The filler used for this Example was a silica filler (Ultrasil ® VN 3, a DEGUSSA product) characterised by the following test data:

| | |
|---|---|
| Nitrogen surface area according to DIN 66 132 | 165 to 180 m²/g |
| Conductivity of a 4.0% suspension in water | 1000 μS/cm (S = Siemens) |
| pH-value according to DIN 53 200 | 6.3 |
| Water content | 5.0% by weight |

10 kg of the silica filler are introduced into the same trough-shaped powder mixer as described in Example 1. 10 kg of 3-chloropropyl triethoxysilane are then sprayed into the mixer. After spraying in, the two components are intensively mixed for another 20 seconds at 360 r.p.m. Thereafter, the discharge unit of the mixer is opened and a homogeneous powder-form mixture of the two components is removed.

Example 3

The inorganic filler used in this case was natural aluminium silicate (clay) characterised by the following data:

| | |
|---|---|
| Sieve residue according to DIN 53 580 43 μm sieve | 0.05% |
| Mean particle size | 2 μm |
| Nitrogen surface area according to DIN 66 132 | 30 m²/g |
| pH-value according to DIN 53 200 | 5.5 |

17 kg of the natural aluminium silicate characterised above were introduced into the powder mixer described in Example 1, 3 kg of 3-chloropropyl triethoxysilane were added, followed by intensive mixing for 20 seconds. Thereafter the discharge valve was opened and a homogeneous, powder-form mixture of the two components was discharged with the mixing tool rotating.

The preparations according to the invention can be used in moulding compositions based on optionally cross-linkable polymers, such as, in particular, thermoplastic polymer, which contain silicate fillers and/or carbon black as filler. Polymers such as these include inter alia polyolefins, such as polyethylene, polypropylene, ethylene-propylene copolymers, etc.

The preparations are preferably used with good and unexpected, advantageous results in compositions and moulding compositions based on natural and synthetic rubbers filled with silicate fillers and, optionally, with carbon black. The rubbers include in particular natural rubbers, polybutadiene rubbers, polyisoprene rubbers, butadiene-styrene rubbers, butadiene-acrylonitrile rubbers, butyl rubbers, terpolymers of ethylene, propylene and unconjugated dienes, e.g., cyclooctadiene, norbornadiene, cyclododecatriene or dicyclopentadiene, carboxyl rubbers, epoxide rubbers and trans-polypentenamers, also halogen rubbers such as, for example, halogenated butyl rubbers, particularly brominated or chlorinated butyl rubbers, chlorinated rubbers, rubber hydrochlorides and, in particular, the polymers of 2-chloro-1,3-butadiene, also chloro-sulphonated polyethylene, ethylene-propylene co-polymers, ethylene-vinyl acetate copolymers, chemical derivatives of natural rubber and modified natural rubbers. Blends of these rubbers may also be used.

In addition to the fillers, the rubber moulding compositions contain the usual constituents, such as cross-linkers, accelerators, antiagers, plasticisers or plasticiser oils, also aliphatic acids such as, for example, stearic acid, metal oxides such as zinc oxide, magnesium oxide and/or lead oxide, optionally sulphur, stabilisers against ageing, fatigue, ozone and/or light and optionally oligo-sulphidic silanes (Thurn U.S. Pat. No. 3,873,489 or DE-PS No. 25 42 534 or related Pletka U.S. Pat. No. 4,072,701) which may even replace sulphur as cross-linking agent. DE-PS No. 25 36 674 or related Pletka U.S. patents and the Wolff U.S. application Ser. No. 034,203 of Apr. 27, 1979 are hereby incorporated by reference and relied upon.

The rubber moulding compositions are produced by methods known per se. In the following Application Examples, the quantities in which the mixture components are used are given in parts by weight (PW). The respective comparison mixtures are identified by the letter "V" before the number. The corresponding mixtures containing the preparations according to the invention are identified by the letter "E".

APPLICATION EXAMPLES

Example 4

The following moulding compositions or mixtures based on styrene-butadiene rubber (SBR 1500) demonstrate the advantageous use of silane/filler preparations according to the invention with synergistic effect:

| Constituents | Mixture No. (quanities in parts by weight) | | | | | |
|---|---|---|---|---|---|---|
| | V4.1 | V4.2 | V4.3 | V4.4 | E4.1 | E4.2 |
| SBR 1500 | 100 | 100 | 100 | 100 | 100 | 100 |
| Zinc oxide (see Example 1) | 4 | 4 | 4 | 4 | 4 | 4 |
| Stearic acid | 2 | 2 | 2 | 2 | 2 | 2 |
| Silica filler (see Example 2) | 50 | 50 | 50 | 50 | 50 | 42.5 |
| HAF-carbon black N330 | — | — | 7.5 | 7.5 | — | — |
| Cl-PTES purified with ammonia | — | 7.5 | — | 7.5 | — | — |
| Preparation carbon black/Cl-PTES[1] | — | — | — | — | 15 | — |
| Preparation silica filler/Cl-PTES[2] | — | — | — | — | — | 15 |
| N-cyclohexyl-2-benzothiazole sulphenamide | 1.5 | 1.5 | 1.5 | 1.5 | 1.5 | 1.5 |
| Sulphur | 2 | 2 | 2 | 2 | 2 | 2 |

[1] 1:1 mixture of HAF-carbon black and Cl-PTES according to Example 1
[2] 1:1 mixture of silica filler and Cl-PTES according to Exmample 2

The six mixtures were tested in accordance with the known Standards. The relevant test results are set out in the following Table (vulcanisation temperature=160° C.).

|  | V4.1 | V4.2 | V4.3 | V4.4 | E4.1 | E4.2 |
|---|---|---|---|---|---|---|
| Vulcanisation time | 85 | 80 | 80 | 80 | 80 | 80 |
| Tensile Strength (in MPa) | 16.2 | 18.7 | 18.5 | 16.2 | 17.7 | 17.7 |
| Modulus 200 (in MPa) (see DIN 53 504) | 2.5 | 5.9 | 3.5 | 5.1 | 6.1 | 7.0 |
| Modulus 300 (in MPa) (see DIN 53 504) | 4.5 | 11.3 | 6.2 | 10.4 | 12.2 | 13.9 |
| Breaking elongation (in %) | 620 | 390 | 550 | 340 | 370 | 340 |
| Shore hardness (DIN 53 505) | 62 | 69 | 70 | 72 | 72 | 69 |
| Wear (DIN 53 516) | 133 | 91 | 118 | 93 | 91 | 91 |
| Rheometer test (DIN 53 529 Provisional) |  |  |  |  |  |  |
| $D_{min}$ (in NM) | 1.90 | 1.36 | 2.37 | 1.42 | 1.52 | 1.58 |
| $D_{120'}$ (in NM) | 8.49 | 12.53 | 10.07 | 13.47 | 13.88 | 12.38 |
| $D_{120'} - D_{min}$ (in NM) | 6.58 | 11.18 | 7.70 | 12.05 | 12.36 | 10.80 |
| $\dfrac{D_{120'} - D_{60'}}{D_{120'} - D_{min}} =$ | 16.5 | 8.2 | 11.1 | 6.5 | 7.7 | 10.3 |
| Mooney rest (DIN 53 523/24) |  |  |  |  |  |  |
| ML 4 (100° C.) | 155 | 122 | 172 | 124 | 127 | 132 |
| $t_5$ (130° C.) | 70 | 83.7 | 60.0 | 61.7 | 64.1 | 85.4 |

The figures representing the test results show the following. By adding 7.5 parts by weight of 3-chloropropyl triethoxy silane to the comparison or control mixture V4.1, the following improvements are obtained: increase in tensile strength, remarkable increase in moduli and Shore hardness and improvement in abrasion or wear (V4.2). As expected, slight improvements in the properties of the vulcanisates are also obtained by the addition of carbon black. The Rheometer values are also improved to some extent whereas—again as expected—Mooney viscosity is impaired (V4.3 compared with V4.1). If, now the silane is added (see V4.4 compared with V4.3), the (in some cases very distinct) improvements again occur, except there is no increase in tensile strength.

However, if now the preparations according to the invention (see E4.1 and E4.2) are used instead of the separate individual additions, further improvements in the moduli and cross-link density surprisingly occur both in the black mixture and also in the white mixture. These synergistic effects were confirmed after the preparations had been stored for two months, which is indicative of high stability in storage of the preparations according to the invention.

Example 5

The following mixtures based on silica-filled poly-2-chloro-1,3-butadiene (Bayprene 210, a product of Bayer AG) were prepared and tested:

|  | Quantities in the mixtures | | |
|---|---|---|---|
|  | V5.1 | V5.2 | E5.1 |
| Constituents |  |  |  |
| Polychlorobutadiene | 100.0 | 100.0 | 100.0 |
| Magnesium oxide, light | 4.0 | 4.0 | 4.0 |
| Silica filler (see Example 2) | 40.0 | 40.0 | 38.0 |
| Cl-PTES | — | 2.0 | — |
| Preparation of equal parts of Cl-PTES and silica filler (see above) | — | — | 4.0 |
| Naphthenic plasticiser oil (setting point -28° C.) | 15.0 | 15.0 | 15.0 |
| Ethylene thiourea | 0.75 | 0.75 | 0.75 |
| Zinc oxide (Read Seal Quality) | 5.0 | 5.0 | 5.0 |
| Test Results: |  |  |  |
| Tensile strength (in MPa) | 11.7 | 11.4 | 16.2 |
| Modulus 300 (in MPa) | 5.4 | 10.2 | 11.1 |
| Breaking elongation (in %) | 540 | 320 | 390 |
| Rheometer Test |  |  |  |
| $D_{max}-D_{min}$ (in Nm) | 7.50 | 9.63 | 13.10 |

The test results of Example 5 also demonstrate the superior effect of the preparation according to the invention (E5.1) in relation to the separate addition of the constituents of the preparation in equal quantities (V5.2) and in relation to the control mixture (V5.1).

Example 6

If, in the mixtures of Example 5, the silica filler is supplemented by a clay (Suprex Clay, a product of J. M. Huber Corp., Locust, N.J., U.S.A.), the required improvements are also obtained (see following Table). Synergistic effects could also be observed in the case of the clay-filled mixture.

|  | Quantities in the mixture | | |
|---|---|---|---|
|  | V6.1 | V6.2 | E6.1 |
| Constituents |  |  |  |
| Polychlorobutadiene (see example 5) | 100.0 | 100.0 | 100.0 |
| Magnesium oxide, light | 4.0 | 4.0 | 4.0 |
| Silica filler | 40.0 | 40.0 | 40.0 |
| Suprex Clay | — | 11.3 | — |
| Preparation according to Example 3 (Cl-PTES and Suprex Clay) | — | — | 13.3 |
| Naphthenic plasticiser oil (setting point -28° C.) | 15.0 | 15.0 | 15.0 |
| Ethylene thiourea | 0.75 | 0.75 | 0.75 |
| Zinc oxide (Red Seal Quality) | 5.0 | 5.0 | 5.0 |
| Test Results: |  |  |  |
| Tensile strength (in MPa) | 16.0 | 14.7 | 17.7 |
| Modulus (in MPa) | 5.0 | 6.0 | 12.1 |

| | Quantities in the mixture | | |
|---|---|---|---|
| | V6.1 | V6.2 | E6.1 |
| Breaking elongation (in %) | 670 | 620 | 430 |

Industrial applications for the rubber mixtures of moulding compositions and their vulcanisates are, for example, industrial rubber articles such as cable sheaths, hoses, heating tubes, also electrical insulations, linings, impregnations and coatings of heat-resistant fabrics, particularly drive belts, V-belts, conveyor belts, roll coverings, seals, tyres, particularly tyre treads, as well as shoe soles, damping and vibration elements and similar articles.

The entire disclosure of German priority application No. P 29 33 346.8-43 is hereby incorporated by reference.

What is claimed is:

1. A silane/filler preparation, consisting essentially of from 5 to 70% by weight of at least one silane corresponding to the following formula $$X_p\text{—}C_mH_{2m+1-p}SiR_n^1(OR)_{3-n},\qquad I$$

in which
X = a halogen atom
p = 1 or 2,
m = 1 to 5,
$R^1$ = a $C_1$- to $C_5$-alkyl group, a $C_5$- to $C_8$-cycloalkyl group or the phenyl group,
R = a $C_1$- to $C_5$-alkyl group, a $C_5$- to $C_8$-cycloalkyl group, the phenyl group, the benzyl group or a $C_1$- to $C_5$-alkoxy-$C_1$- to $C_5$-alkyl group, and
n = 0, 1 or 2,
and—respectively balanced to 100%—from 95 to 30% by weight of at least one inorganic filler based on the two components.

2. A silane/filler preparation as claimed in claim 1 where R is a $C_1$- to $C_5$-alkyl group, a $C_5$- to $C_8$-cycloalkyl group, a phenyl group or a benzyl group.

3. A silane/filler preparation as in claim 2 wherein X is chlorine or bromine.

4. A silane/filler preparation as in claim 3 wherein the filler is carbon black or a silicate filler.

5. A silane/filler preparation as claimed in claim 4 wherein the inorganic filler is carbon black.

6. A silane/filler preparation as claimed in claim 5 wherein the carbon black is a furnace black having a specific surface area of from 30 to 140 m²/g and a mean primary particle size of from 20 to 60 nm.

7. A silane/filler preparation as claimed in claim 4 wherein the inorganic filler is a silica filler produced pyrogenically or by precipitation in aqueous medium.

8. A silane/filler preparation as claimed in claim 7 wherein the silica filler is a silica filler having a specific surface area of from 100 to 250 m²/g and a mean primary particle size of from 10 to 400 nm.

9. A silane/filler preparation as claimed in claim 7 wherein the silica filler is one which has been hydrophobised with at least one silane.

10. A silane/filler preparation as claimed in claim 3 wherein the inorganic filler is a natural light filler suitable for use in rubber technology.

11. A silane/filler preparation as claimed in claim 10 wherein the natural light filler is kaolin, clay, chalk, siliceous chalk or diatomaceous earth.

12. A process for the production of a silane/filler preparation which comprises introducing at least one carbon black and/or at least one silicate filler in powder form into a powder mixer in a quantity of from 95 to 30% by weight, after which at least one liquid silane corresponding to the following formula $$X_p\text{—}C_mH_{2m+1-p}SiR_n^1(OR)_{3-n},\qquad I$$

in which
X = a halogen atom
p = 1 or 2,
m = 1 to 5,
$R^1$ = a $C_1$- to $C_5$-alkyl group, a $C_5$- to $C_8$-cycloalkyl group or the phenyl group,
R = a $C_1$- to $C_5$-alkyl group, a $C_5$- to $C_8$-cycloalkyl group, the phenyl group, benzyl group or a $C_1$- to $C_5$-alkoxy-$C_1$- to $C_5$-alkyl group, and
n = 0, 1 or 2,
is added in a quantity of from 5 to 70% by weight, respectively balanced to 100% relative to the filler, followed by brief intensive mixing until a powder-form or granular free-flowing preparation is formed.

13. A process as claimed in claim 12 wherein the silane is sprayed onto the particles of the filler in motion in the powder mixer.

14. A process as claimed in claim 12 wherein the silane is applied in solution or suspension to the particles of the filler in motion in the powder mixer.

15. A silane/filler preparation as claimed in claim 4 wherein n is 0.

16. A silane/filler preparation as claimed in claim 15 where R is a $C_1$- to $C_5$-alkyl group.

17. A silane/filler preparation as claimed in claim 16 where p is 1.

18. A silane/filler preparation as claimed in claim 17 where the silane is 3-chloropropyl triethoxysilane.

19. A moulding composition comprising a silane/filler of claim 1 and a mouldable polymer.

20. A moulding composition according to claim 19 which is vulcanisable.

21. A vulcanisable or cross-linkable rubber moulding composition comprising a silane/filler of claim 1 and a vulcanisable or cross-linkable rubber.

22. A composition according to claim 21 wherein the rubber is a sulphur vulcanisable natural rubber or synthetic rubber.

23. A composition according to claim 22 wherein the rubber is natural rubber, a polybutadiene, polyisoprene, butadiene-styrene copolymer, butadiene-acrylonitrile copolymer, polychlorobutadiene, butyl rubber, chlorobutyl rubber, bromobutyl rubber, or ethylene-propylene-non-conjugated polyene terpolymer.

* * * * *